United States Patent [19]

Kolstad et al.

[11] Patent Number: 5,066,033
[45] Date of Patent: Nov. 19, 1991

[54] METHOD AND APPARATUS FOR LAUNCHING A SMALL BOAT USING ROPE RETENTION GUIDE

[75] Inventors: Lawrence E. Kolstad, Hopkins; Robert R. V. Fumanti, Hibbing, both of Minn.

[73] Assignee: L. & B. Diversified Products, Hopkins, Minn.

[21] Appl. No.: 529,387

[22] Filed: May 29, 1990

[51] Int. Cl.$^5$ ............................ B60P 3/071; B60P 3/10
[52] U.S. Cl. ................................. 280/414.1; 24/130; 414/532; 114/344
[58] Field of Search ............... 280/414.1, 414.2, 414.3; 24/115 F, 115 G, 128, 130, 602; 414/506, 529, 530, 531, 532, 533, 534, 535, 536, 344

[56] References Cited

U.S. PATENT DOCUMENTS

| | | | |
|---|---|---|---|
| 1,397,126 | 11/1921 | Keenum | 24/131 R |
| 2,292,140 | 8/1942 | Lotgren | 24/130 |
| 2,592,696 | 4/1952 | Hoody | 24/129 R X |
| 2,650,448 | 9/1953 | Lichtrg | 24/130 |
| 2,907,484 | 10/1959 | Parker | 414/483 |
| 3,149,735 | 9/1964 | Bleeker | 414/506 |
| 3,178,043 | 4/1965 | Easterwood | 414/532 |
| 3,608,754 | 9/1970 | Park | 414/534 |
| 3,632,138 | 1/1972 | Whitley, Jr. | 280/414.1 X |
| 3,812,811 | 5/1974 | Rodriguez | 24/130 X |
| 3,951,433 | 4/1976 | Starkey | 280/414.1 |
| 4,010,962 | 3/1977 | Groblebe | 280/414.1 |
| 4,094,527 | 6/1978 | Miller | 414/534 X |
| 4,623,161 | 11/1986 | Sprague | 280/414.1 |
| 4,684,145 | 8/1987 | Tingley | 280/414.1 |

Primary Examiner—Charles A. Marmor
Assistant Examiner—Kevin Hurley

[57] ABSTRACT

A boat situated on a boat trailer is fitted with a launching rope, attached at one end to a bow eye on the boat and at another end to an eye bolt attached to the rear of the trailer. The rope is supported between its ends by one or more rope retention guides that are situated adjacent to obstacles on the trailer, notably the keel support rollers, that might otherwise interfere with the rope when the boat is launched. To launch the boat, the launching rope is secured to the bow eye and the eye bolt and the trailer is backed down a boat launching ramp to a point at which the bow of the boat is at the waters edge, at which point the winch cable and safety chain securing the boat to the trailer are detached. The boat may undergo spontaneous premature launch at this point, but if not, the trailer is backed farther into the water, allowing the boat to float free as the trailer enters deeper water. The trailer is then pulled up the ramp to a point at which the boat, tethered to the trailer by the launching rope, reaches the beach. The rope is then released from the eye bolt and secured relative to the beach while the trailer is parked. The rope retention guides are made of spring steel wire, formed with a heart-shaped head having a notch that grips the rope, and a long shank to position the head above and to fasten the device onto the frame of the trailer below.

6 Claims, 3 Drawing Sheets

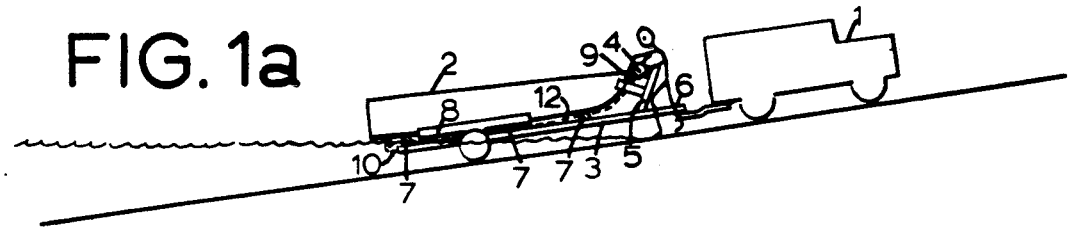
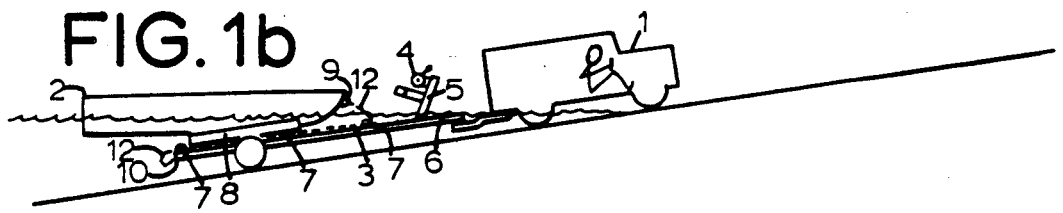
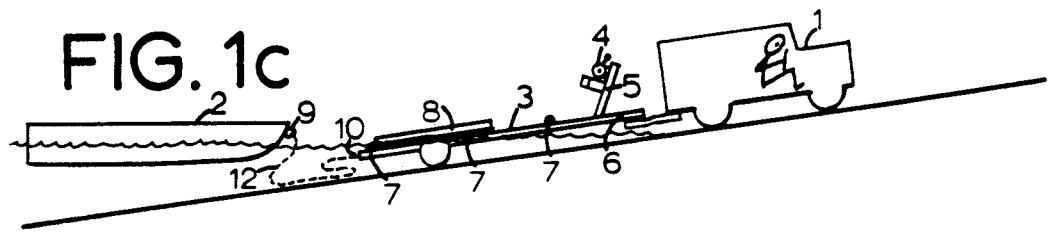
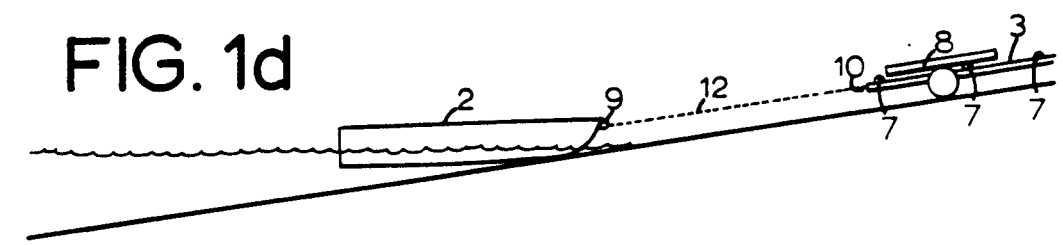
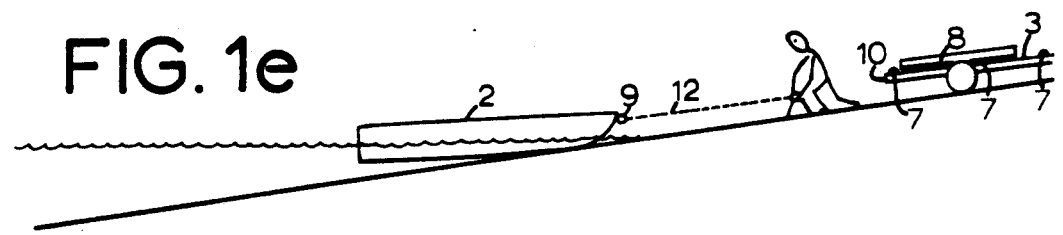
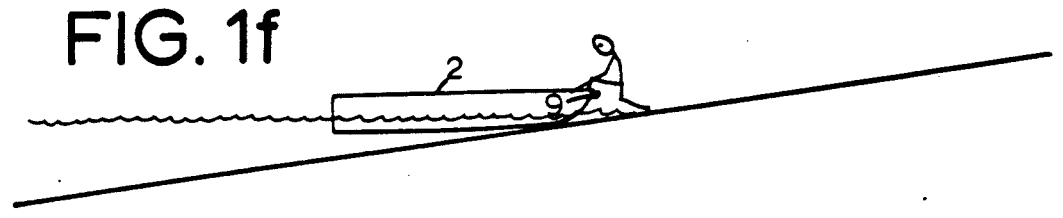

U.S. Patent   Nov. 19, 1991   Sheet 3 of 3   5,066,033
FIG. 4     FIG. 5     FIG. 6
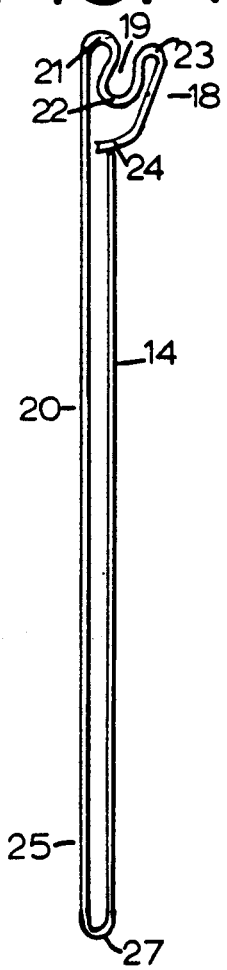
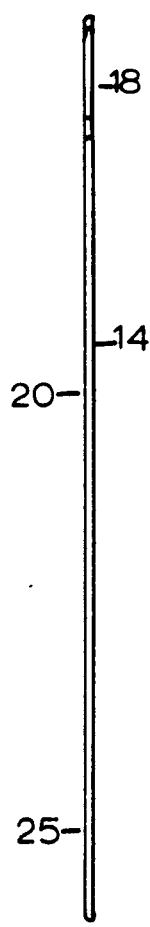
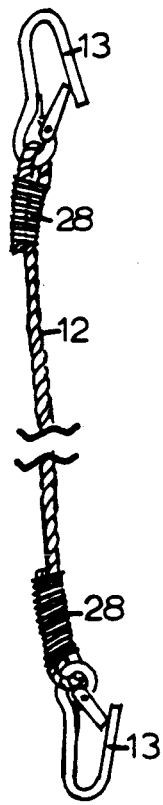
FIG. 7
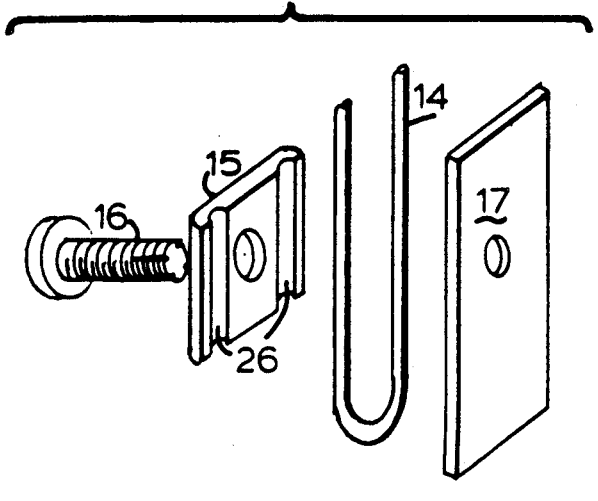
FIG. 8
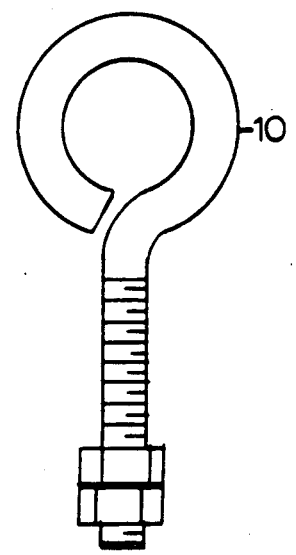

METHOD AND APPARATUS FOR LAUNCHING A SMALL BOAT USING ROPE RETENTION GUIDE

BACKGROUND OF THE INVENTION

1. Field of the Invention

Inventions relating to launching small boats are classified with material handling and management of bulky articles such as cargo, Class 414 Subclass 506 and 529 through 536. Launching boats from ships is a another problem, classified in Class 114 Subclass 344. Central to our boat launching system is a rope retention guide wire (RRG) of a kind that is classified as a releasable fastener, Class 24 Subclass 115 and Subclass 602.

2. Prior Art

A separate prior art statement has been submitted to report what was found in the patent literature about small boat launching and about releasable fasteners. No art was found that suggested the approach to the problem of small boat launching which we disclose here. What was found is a system for launching a boat from a boat trailer using the winch to urge the boat off the trailer, a different objective from that sought for in our invention, which is to facilitate the launching of a boat by one person and to assure control of the boat once launched.

A variety of releasable fasteners to manage ropes for different purposes are reported, but no reference was found to our application, and no design like ours was uncovered.

A variety of boat launching systems may be observed at any popular boat launching ramp on a fair day. The most common is a launch managed by two or more individuals, one of whom drives the vehicle that pulls the trailer and one of whom assists by pushing the boat off the trailer and then controlling a hand line to the boat. This system puts the assistant in jeopardy as he or she stands on the tongue of the trailer, handling a rope in one hand and pushing off with the other.

Another system employs the winch cable (which is normally employed for loading the boat onto the trailer) as a control cable for launching the boat. This system is dangerous because the ratchet that prevents uncontrolled release of the cable when the winch is used to load the boat must be turned off, with the result that the winch crank handle can spin wildly out of control if it is mismanaged while the boat is rolling off the trailer, when the cable is placed under great tension, with possible injury to the operator and/or a cable fouled on the winch drum due to run on of the winch drum after the boat is launched.

3. The Problem

Small boats are carried on wheeled trailers for travel on the highways, and the boat is launched by backing the trailer down an incline or ramp to approach the shoreline at a place where the water is deep enough to float the boat. As long as the boat is secured upon the bed of the trailer, it is in stable attitude, being supported at its hull and keel by rubber rollers and/or padded boards called bunks. The problem develops when the boat is released from its linkage at the bow eye to the winch post on the trailer because then, when the boat is pushed off the trailer into the water, it is liable to be swept away by the current.

We considered securing the boat to the trailer with a length of rope so that the boat might always be attached, but that approach, without more, is inadequate because as the boat is launched, such a rope is likely to become tangled up on obstacles on the frame of the trailer, to arrest the boat in the middle of the launch, the boat swinging sideways dangerously against the trailer and imperiling the operator who attempts to intervene while waist deep in water with the steel beams of the trailer on one side and on the other side the hull of the boat, swinging against the force of the current or wind.

SUMMARY OF THE INVENTION

Our small boat launching system makes use of a launch aid rope that is releasibly fastened by snap hooks at each end to the bow eye of the boat at one end and to the rear of the trailer at the other end. The launch aid rope runs along the bottom of the boat and is supported and positioned against entanglement upon trailer underparts by means of releasable rope retention guide wires (RRGs) which support the launch aid rope at positions above, forward, and to the side of every obstacle. The versatile guide wires (RRGs) can be attached to any substantial structure of the trailer frame and can be positioned to meet every need.

It is an object of the invention to provide a system using a launch aid rope to connect the bow of the boat to the rear of the trailer which will enable an inexperienced boating enthusiast to launch his or her small boat with confidence and safety.

It is a further object of the invention to provide releasable rope retention guide wires (RRGs) which can be fastened to the frame of the boat trailer to grip the launch aid rope in positions above, forward, and to the side of obstacles which might otherwise interfere with the rope when it plays out during launch.

Our invention simplifies the problem of launching a boat by the inexperienced boating enthusiast.

Our boat launching system has an advantage over existing systems because it protects against accidental loss of the boat during launch by inexperienced boat owners.

Our boat launching system employs releasable rope retention guides (RRGs), i.e., guide wires of unique configuration, and provides the means for mounting those guide wires in positions to hold a rope away from entanglement during launching.

DESCRIPTION OF THE DRAWINGS

FIG. 1 is a set of six schematic drawings illustrating successive steps in launching a small boat by our method. Each drawing shows a ramp incline leading to a body of water.

FIG. 1a Preparing for Launch
FIG. 1b Floating the Boat
FIG. 1c Beaching the Boat, Step i
FIG. 1d Beaching the Boat, Step ii
FIG. 1e Beaching the Boat, Step iii
FIG. 1f Boarding the Boat and Shoving Off FIG. 2 Is a perspective view drawn from the above right rear of the boat and trailer. The boat is shown suspended over its place on the trailer, to reveal the details that stand in between.

FIG. 4 is a front elevation of a releasable rope retention guide wire (RRG).

FIG. 5 is a side elevation of the guide wire of FIG. 4.

FIG. 6 is perspective view of the launch aid rope, showing representative snap hooks at each end, an intermediate length of rope being deleted to simplify the illustration.

FIG. 7 is a perspective view showing a clamping assembly that may be used for mounting a guide wire (RRG).

FIG. 8 is a plan view of a common machine eye bolt of the type that is useful for establishing an attachment point at the rear of the boat trailer.

DESCRIPTION OF THE PREFERRED EMBODIMENT

1. Introduction

Figure 2:
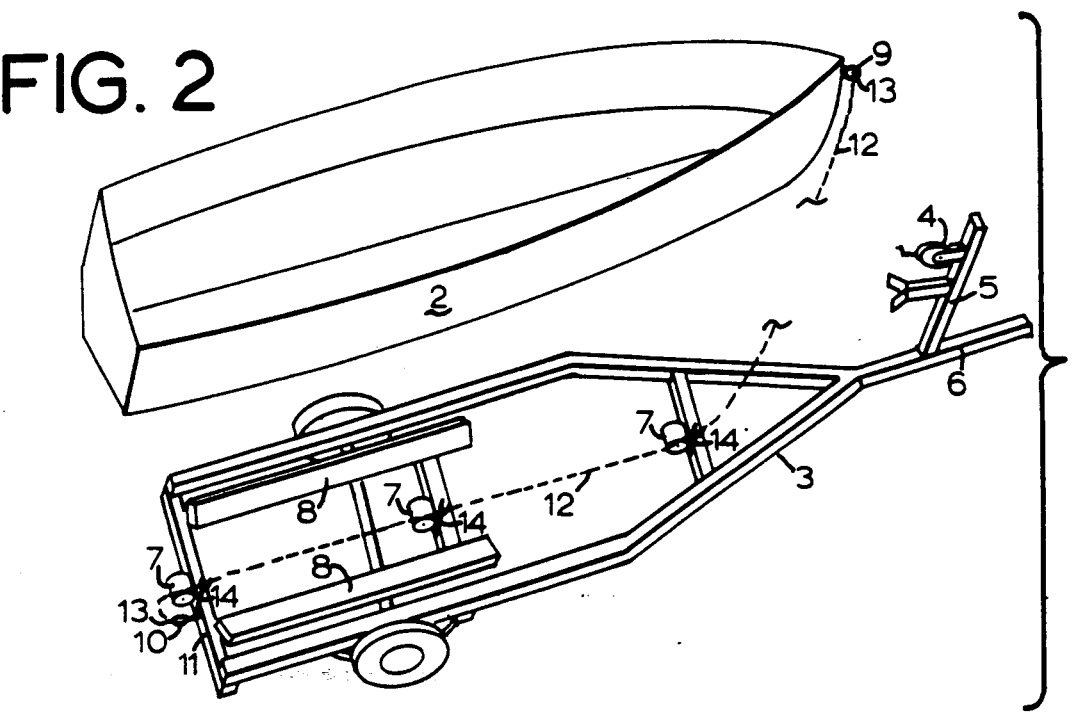

Included in the environment (FIGS. 1, 2) of our invention is a tractor vehicle such as a pick-up truck 1, a small boat 2, such as a sixteen- to eighteen-foot fishing boat, and a boat trailer 3 of accommodating size. Such trailers include a winch 4 mounted on a winch post 5 on the tongue 6 of the trailer, to pull the boat out of the water when loading the boat onto the trailer from out of the water; rubber keel rollers 7 (see also FIG. 3) which support the weight of the boat but permit the boat to be moved lengthwise on the trailer with the benefit of rolling friction; and optional additional support such as side rollers (not illustrated) or bunks 8. Bunks are boards that have been upholstered with carpet and supported on brackets in position to cradle the boat. All boats are equipped with a bow eye 9, a fixed ring at the bow which serves for fastening cables, ropes and chains to the boat.

2. An Eye at the Rear End of the Trailer

To practice our invention, we first install a heavy-duty eye bolt 10 (FIG. 8) at the rear of the trailer at a point near the midline of the rear cross member 11 of the trailer, to provide a place for attachment of a snap hook. If there is no suitable rear cross member for this purpose, an alternative attachment point may be provided by mounting a chain or cable (not illustrated) across the rear ends of the side members of the trailer.

Note that while the position of the eye bolt 10 is indicated in FIG. 1, the diminished scale of those drawings did not permit their actual illustration. For a clear view of the location of the eye bolt lo see FIG. 2.

3. The Launch Aid Rope

We equip a rope 12 with snap hooks 13 at each end (FIG. 6), adjusting the length of the rope so that it will reach between the bow eye 9 and the eye bolt 10 at the rear of the trailer when the boat is situated upon the trailer.

The snap hooks may be secured to the ends of the rope by passing the end of the rope through the eye in the snap hook and then securing the free end of the rope with seizing 28 as illustrated in FIG. 6, or by any of the following alternative methods (not illustrated): making an eye splice; using a suitable knot such as the Berkley knot; using cable clamps; or using malleable steel rope clamps.

4. The Releasable Rope Retention Guides (RRGs) and Clamps

We provide a rope-positioning guide wire 14 (FIGS. 2, 3, 4 and 5) at positions adjacent to every obstacle such as the hard rubber keel rollers 7 which might catch the rope as it loops rearward across the frame of the trailer during launching of the boat. Each guide wire 14 is secured to the frame of the trailer by means of a flat rectangular metal clamp 15 (FIG. 7) which is attached with a self-tapping screw 16 in a hole drilled into the trailer frame for that purpose. In FIG. 7 the demonstration plate 17 represents a place on the frame.

Each guide wire 14 is positioned so that a head end 18 (FIG. 4) is above, in front of, and to the side of the obstacle to be protected against. The most common obstacles are the hard rubber rollers 7 (FIGS. 2, 3) mounted on cross members at the midline of the trailer. For a sixteen-foot boat trailer, three guide wires are usually sufficient to protect the launch aid rope against being caught on such obstacles.

The releasable rope retention guide (RRG) 14 (FIG. 4) which is featured in our invention is made by bending spring steel wire to form a heart-shaped head 18 with a notch 19 within a middle loop 22 to receive the girth of the rope and grip it securely until substantial tension is exerted on the rope. The force exerted upon the launch aid rope during the launching of the boat is sufficient to overcome the grip of the guide wire upon the rope, the releases occurring sequentially from front to rear as the boat rolls off or floats off of the trailer.

The guide wire (RRG) has the following features (FIG. 4): a shank 20, a heart-shaped head 22 at one end of the shank, to grip the rope, and a tail 25 bent back to provide parallel wires which secure the head against rotation when the guide wire is clamped in place with the clamp assembly (FIG. 7).

Exceptional circumstances may require that the head of the guide wire be positioned beyond its normal reach, and that need is easily met by straightening the tail and introducing a new bend. We have also made use of simple adapters (not illustrated) to extend the reach of the guide wire.

5. Preparing the Boat and Trailer

Guide wires (RRGs) 14 are installed at each of the obstacles (FIG. 3) and an eye bolt 10 or other snap hook attachment means is installed at the rear of the trailer (FIG. 2). With the boat situated on the trailer, the launch aid rope 12 is fitted to the boat and trailer, with one snap hook 13 secured to the bow eye 9 and the other snap hook secured to the eye 10 or other means at the rear of the trailer, the launch aid rope 12 (FIG. 6) having been adjusted to a length providing minimal slack while secure in the grip of the installed guide wires 14 (FIG. 2).

6. The Rope Retention Guide Wires (RRGs)

The guide wire 14 of this invention is made from spring steel wire of approximately one-eighth inch diameter and of length approximately twenty-four inches. At one of the wire a series of three serpentine loops is formed, as illustrated in FIG. 4, to produce a heart-shaped figure, the head 18. The loops all lie in the same plane: a first semicircular clockwise loop 21 is bent upon a post of one-quarter inch diameter; a second semicircular loop 22 is bent counterclockwise on a post of seven-sixteenths inch diameter; and a third semicircular loop 23 is bent on a post of one-quarter inch diameter; a stub end 24 of the wire immediately following the third loop is directed at an angle to butt against the shank 20 and complete the heart-shaped head 18.

By closing the eye of the heart-shaped figure and establishing a Y shaped configuration rather than a shepherd's crook configuration, we have avoided the possibility that the rope might become caught upon the guide wire itself when plays out during the launching of the boat. With the Y configuration, the rope slips easily over the heads of the guide wires.

The guide wire, being made of spring steel, is stiff and resilient. The second loop 22 of the series of three loops at the head is closed to the extent that the notch 19 is of lesser width than the girth of the rope. It is the spring character of the second loop that permits the girth of the rope to be sprung into the notch 19 and be gripped there until a substantial force is put upon the rope to cause it to disengage.

The wire is bent back upon itself at about midpoint on a post of three-eighths inch diameter to meet the butt 24 at the head end of the device, and to present two parallel wire elements standing about one-half inch apart and standing in the same plane as the heart-shaped head. The tail 25 is simply the end opposite the head end.

7. Detailed Description of the Clamp

Our preferred method of mounting the rope retention guide is by means of a clamping block 15 (FIG. 7) of the following description. A rectangular solid block of metal, preferably aluminum, of dimensions $\frac{3}{4}"\times\frac{3}{8}"\times 3/16"$ (thickness) is prepared with two parallel hemicylindrical grooves 26 spaced apart $\frac{1}{8}$ inch and parallel with the long dimension of one face, the grooves spaced to accommodate the parallel wires of the guide wire 14. Perpendicular to the $\frac{3}{4}"\times\frac{3}{8}"$ face and centered on it is a hole of 5/16" diameter, to receive the shank of a self-tapping pan head machine screw 16 of length one inch overall. To mount a rope retention guide wire (RRG) in a position to support the launch aid rope above and to the side of a given obstacle, the installer must locate the position for the clamp, drill a hole in the cross member, assemble the guide wire within the grooves of the clamp and upon the hole, drive in the screw and make a final adjustment of the position of the guide wire by extending or retracting the shank 20 within the clamp before finally tightening the screw.

PROTOCOL FOR LAUNCHING THE BOAT

Figure 3:
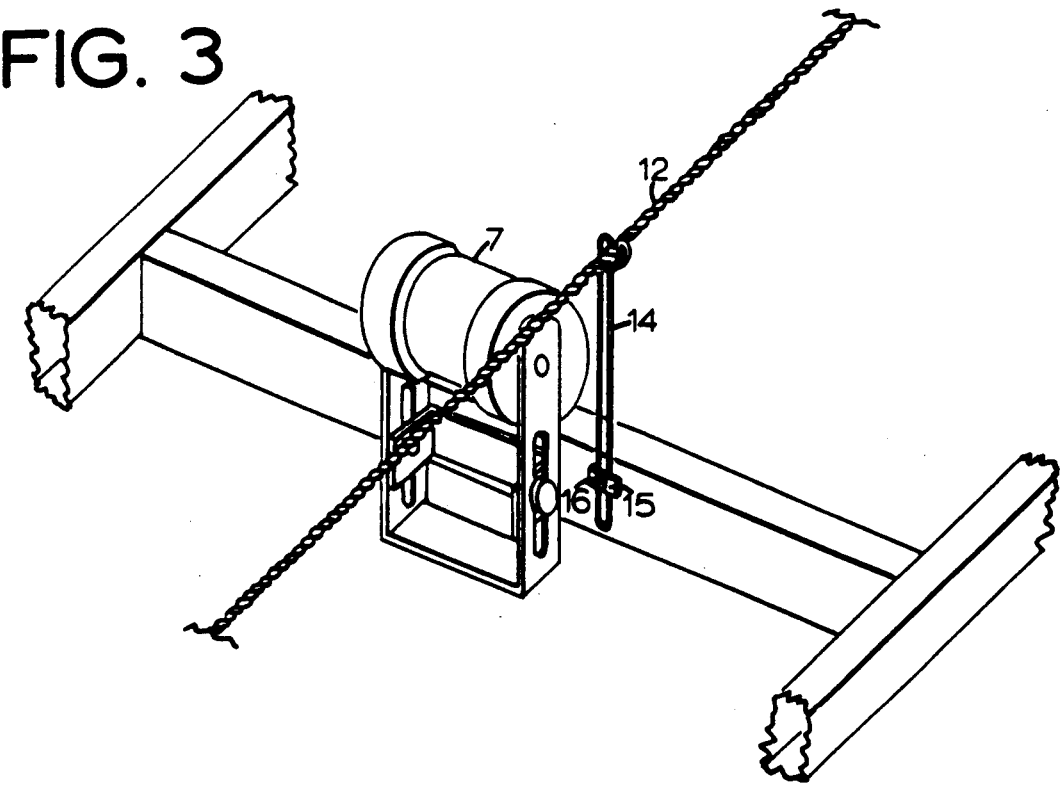
FIG. 3 is a detailed perspective partial view of the frame of the boat trailer, parts being broken away, showing a guide wire (RRG) mounted on a cross member and supporting a rope away from an obstacle.

In preparation for the launch, the launch aid rope, snap hooks at both ends, was adjusted to a length to reach from the bow eye bolt to the rear end of the trailer. The snap hook at one end of the launch aid rope was secured into the eye bolt or chain at the end of the trailer and the rope was strung forward toward the winch post while being secured into each of the intermediate guide wires (RRGs) as illustrated in FIG. 3. The boat is now situated upon the trailer and it is secured to the winch post by both a cable or rope (not illustrated) from the winch and by a safety chain (not illustrated) both of which are attached to the bow eye of the boat. If space within the bow eye of the boat permits, the forward end of the launch aid rope is also secured to the bow eye and if no space remains, the forward end of the launch aid rope is secured to the winch post.

The tractor vehicle towing the trailer is backed down the ramp at the launch site until the trailer is over the water but the winch post is just at the water's edge. With the brakes applied to the tractor, the operator leaves the tractor and goes to the winch post and without entering the water or climbing onto the trailer, he or she will detach the winch cable and safety chain from the bow eye and will attach the launch aid rope to the bow eye if it is not already in place (see FIG. 1a). Under some circumstances the boat will now launch spontaneously without further action on the part of the operator. For example, if the trailer is fully equipped with roller supports and if the slope of the ramp is favorable, a premature launch can occur. This is no problem because the boat is over the water and fully controlled by the launch aid rope.

Assuming that a premature launch does not occur, the operator will examine the condition beyond the foot of the ramp to verify the safety of backing the tractor beyond waters edge, and will return to the tractor and back the trailer deeper into the water, the heavy trailer sinking away from the buoyant boat, which floats free except for the launch aid rope which tethers it to the rear of the trailer. (FIG. 1b). The separation of the boat from its supporting elements on the trailer is abetted by the act of braking the trailer, whereupon the inertial force of the boat overcomes the frictional forces of the boat's hull within the supporting elements. Separation is completed by driving the tractor back up the ramp (FIG. 1c), the operator now carefully monitoring the progress of the boat as it is drawn toward the shore at the end of the launch aid rope and stopping the tractor when the boat is beached (FIG. 1d). The operator then leaves the tractor and returns to the boat, to make beaching secure, to detach the launch aid rope from the trailer, and to secure the rope to an anchor point on shore if conditions require such precaution (FIG. 1e). The operator then returns to the tractor and hauls the trailer to a parking area. Returning to the ramp, the operator frees the launch aid rope from the shore anchor and carries it to the boat, climbs into the boat and proceeds with the excursion.

The excursion completed, the operator beaches the boat and disembarks with the rope in hand, carrying it forward to a suitable shore anchor if necessary before returning to the parking area to recover the tractor and trailer. The operator then backs the trailer into the water alongside the beached boat and attaches the winch cable to the bow eye before maneuvering the boat into position behind the trailer. The boat is then loaded onto the trailer in the usual way, by cranking the winch until the boat is brought forward into place on the trailer. After the trailer is fully out of the water, the launch aid rope may be repositioned for the next launch.

Having described our invention, what we claim is:

1. A method for launching a boat from a trailer having means for easing movement of the boat back and forth thereon including the following steps:
   attaching one end of a launching rope of a predetermined length to an eye at the bow of the boat and a second end of the launching rope to an eye bolt at the rear of the trailer;
   releasably securing the launching rope to guide means spaced along the length of the trailer at predetermined locations;
   backing the trailer to a position for launching the boat and detaching any remaining connections between the boat and trailer except for the launching rope;
   launching the boat from the trailer while the launching rope is sequentially released from the guide means spaced along the trailer;
   maintaining the connection of the boat to the trailer with the launching rope while pulling the trailer forward until the boat reaches the beach; and
   detaching the launching rope from the eye bolt and securing it relative to the beach thereby permitting removal of the trailer from the launching area.

2. A method of preparing a boat trailer for the launching of a boat therefrom comprising the following steps:
   attaching rope retention guide means at spaced apart predetermined locations along the length of the trailer to guide a launching rope past obstacles on the trailer; and attaching an eye bolt at a rear end of the trailer for the attachment of one end of a launching rope.

3. A guide means for a launching rope used with a boat and trailer comprising a length of spring steel wire shaped at one end by a series of bends into a heart-shaped head having a notch to accept the girth of the rope and grip the rope against release until a substantial force exerted by launching of the boat from the trailer pulls the rope therefrom, said guide means including a shank extending from said heart-shaped head, clamping block means attached to said trailer at a predetermined location for fixedly securing the guide means relative to the trailer, wherein said predetermined location is proximate an obstacle to be avoided by said rope and said guide means is disposed such that the rope is guided past said obstacle.

4. A guide means as set forth in claim 3 wherein said shank is formed by the wire extending from said heart-shaped head being bent back to provide generally parallel wires thereby preventing rotation of the guide means when secured by the clamping block means.

5. A guide means as set forth in claim 4 wherein said heart-shaped head is formed by three serpentine loops all in generally the same plane.

6. A guide means as set forth in claim 5 wherein said guide means includes a plurality of rope guides disposed at a plurality of predetermined locations along the length of the trailer, each location being proximate an obstacle to be avoided by said rope.

* * * * *